US011709403B2

(12) United States Patent
Geng et al.

(10) Patent No.: US 11,709,403 B2
(45) Date of Patent: Jul. 25, 2023

(54) DISPLAY PANEL AND DISPLAY APPARATUS

(71) Applicants:BEIJING BOE DISPLAY TECHNOLOGY CO., LTD., Beijing (CN); BOE Technology Group Co., Ltd., Beijing (CN)

(72) Inventors: Shixin Geng, Beijing (CN); Yu Zhang, Beijing (CN); Tengfei Wang, Beijing (CN)

(73) Assignees: BEIJING BOE DISPLAY TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 2 days.

(21) Appl. No.: 17/349,951

(22) Filed: Jun. 17, 2021

(65) Prior Publication Data

US 2022/0155647 A1 May 19, 2022

(30) Foreign Application Priority Data

Nov. 13, 2020 (CN) .......................... 202011268320.7

(51) Int. Cl.
*G02F 1/1362* (2006.01)
(52) U.S. Cl.
CPC .. *G02F 1/136222* (2021.01); *G02F 1/136286* (2013.01)
(58) Field of Classification Search
CPC ......... G02F 1/136222; G02F 1/136286; G02F 1/133514; G02F 2201/52; G02F 1/133512;
(Continued)

(56) References Cited

U.S. PATENT DOCUMENTS 9,064,450 B2 * 6/2015 Kashiwabara ....... G09G 3/3225
2006/0039152 A1 2/2006 Ito
(Continued)

FOREIGN PATENT DOCUMENTS

CN 1737668 A 2/2006
CN 107121837 A 9/2017
(Continued)

OTHER PUBLICATIONS

Office Action dated Oct. 14, 2022 for Chinese Patent Application No. 202011268320.7 and English Translation.

*Primary Examiner* — Hoan C Nguyen
(74) *Attorney, Agent, or Firm* — Ling Wu; Stephen Yang; Ling and Yang Intellectual Property (57) ABSTRACT

Provided is a display panel, including an array substrate, a color filter substrate, and a back light module. The back light module includes a light source, and the light emission spectrum of the light source has a first blue peak and a second blue peak. The color filter substrate is provided with multiple pixel units which are periodically and repeatedly disposed, and at least one pixel unit includes a red sub-pixel, a green sub-pixel, a first blue sub-pixel and a second blue sub-pixel. The first blue sub-pixel and the second blue sub-pixel have different transmittance spectrums; a peak wavelength of a transmittance spectrum of the first blue sub-pixel matches a peak wavelength of the first blue peak of the light source, and a peak wavelength of a transmittance spectrum of the second blue sub-pixel matches a peak wavelength of the second blue peak of the light source.

14 Claims, 7 Drawing Sheets

(58) Field of Classification Search
CPC ......... G02F 1/134336; G02F 1/134309; G02F 2201/123; G02F 1/133603; G02F 1/133788; G02F 1/1333; G02F 1/133614; G09G 2300/0452; G09G 3/2003; G09G 3/3607; G09G 3/3648; G09G 3/3233; G09G 2320/0233; G09G 2320/0242; G09G 3/2074; G09G 2340/06; G09G 3/006; G09G 2300/0439; G09G 3/3413; G09G 2320/0686; G09G 2320/0646; H01L 27/3211; H01L 27/3213; H01L 27/3216; H01L 27/322; H01L 27/14621; H01L 27/14645; H01L 27/3206; H01L 2924/12041; G02B 6/0073; G02B 6/0068; G09F 13/22; G09F 2013/222; H04N 9/04557

See application file for complete search history.

(56) References Cited

U.S. PATENT DOCUMENTS

| | | | | |
|---|---|---|---|---|
| 2008/0268282 | A1* | 10/2008 | Spindler | H01L 51/5278 428/690 |
| 2011/0156575 | A1* | 6/2011 | Yu | C09K 11/565 313/503 |
| 2013/0016522 | A1 | 1/2013 | Baek et al. | |
| 2016/0189671 | A1* | 6/2016 | Kim | G09G 3/3291 345/82 |
| 2017/0115532 | A1* | 4/2017 | Li | G02F 1/133788 |
| 2019/0041699 | A1* | 2/2019 | David | G02B 6/005 |
| 2019/0101792 | A1 | 4/2019 | Yang et al. | |
| 2020/0098301 | A1 | 3/2020 | Bao et al. | |
| 2021/0215978 | A1 | 7/2021 | Li et al. | |

FOREIGN PATENT DOCUMENTS

| | | | |
|---|---|---|---|
| CN | 109243365 A | 1/2019 | |
| CN | 109669299 A | 4/2019 | |
| CN | 208834673 U | 5/2019 | |
| CN | 209265145 U | 8/2019 | |
| JP | 2003107350 A * | 4/2003 | |
| JP | 2005128499 A * | 5/2005 | ............... G02B 5/20 |
| JP | 2006058332 A * | 3/2006 | ............. G02B 5/201 |
| JP | 2006-163425 A | 6/2006 | |

* cited by examiner

DISPLAY PANEL AND DISPLAY APPARATUS

CROSS-REFERENCE TO RELATED APPLICATION

The present application claims priority of Chinese Patent Application No. 202011268320.7 filed to the CNIPA on Nov. 13, 2020, the content of which is hereby incorporated by reference.

TECHNICAL FIELD

Embodiments of the present disclosure relate to, but are not limited to, the field of display technology, in particular to a display panel and a display apparatus.

BACKGROUND

With the continuous progress of display technology, users' demands for display apparatuses are also increasing. A thin film transistor-liquid crystal displays (TFT-LCD) have been developed by leaps and bounds in recent years for its advantages such as low power consumption, low cost and no radiation. In the cell-forming process of current liquid crystal display apparatuses, a cell aligning process is generally adopted to couple a color filter substrate and an array substrate. Then a structure with the cell aligning completed is disposed on a back light module to form a final display panel.

SUMMARY

The following is a summary of the subject matter described in detail in embodiments of the present disclosure. This summary is not intended to limit the protection scope of the claims.

An embodiment of the present disclosure provides a display panel and a display apparatus.

In one aspect, an embodiment of the present disclosure provides a display panel, including an array substrate, a color filter substrate, and a back light module. The back light module includes a light source, wherein a light emission spectrum of the light source has a first blue peak and a second blue peak, and a peak wavelength of the first blue peak is smaller than a peak wavelength of the second blue peak. The color filter substrate is provided with multiple pixel units which are periodically and repeatedly disposed, and at least one of the pixel units includes a red sub-pixel, a green sub-pixel, a first blue sub-pixel and a second blue sub-pixel. The first blue sub-pixel and the second blue sub-pixel have different transmittance spectrums; a peak wavelength of a transmittance spectrum of the first blue sub-pixel matches the peak wavelength of the first blue peak of the light source, and a peak wavelength of a transmittance spectrum of the second blue sub-pixel matches the peak wavelength of the second blue peak of the light source. A transmittance of the first blue sub-pixel for light of a first wavelength band is smaller than a transmittance of the second blue sub-pixel for light of the second wavelength band.

In some exemplary embodiments, the peak wavelength of the transmittance spectrum of the first blue sub-pixel matching the peak wavelength of the first blue peak of the light source includes: the peak wavelength of the transmittance spectrum of the first blue sub-pixel is less than or equal to the peak wavelength of the first blue peak of the light source and greater than or equal to a first set value, wherein the first set value is a difference between the peak wavelength of the first blue peak of the light source and 10 nanometers.

In some exemplary embodiments, the peak wavelength of the transmittance spectrum of the second blue sub-pixel matching the peak wavelength of the second blue peak of the light source includes: the peak wavelength of the transmittance spectrum of the second blue sub-pixel is greater than or equal to the peak wavelength of the second blue peak of the light source and less than or equal to a second set value, wherein the second set value is a sum of the peak wavelength of the second blue peak of the light source and 10 nanometers.

In some exemplary embodiments, a ratio of the transmittance of the first blue sub-pixel for the light of the first wavelength band to the transmittance of the second blue sub-pixel for the light of the second wavelength band is less than or equal to 0.4.

In some exemplary embodiments, the ratio of the transmittance of the first blue sub-pixel for the light of the first wavelength band to the transmittance of the second blue sub-pixel for the light of the second wavelength band ranges from 0.1 to 0.2.

In some exemplary embodiments, a difference between the peak wavelength of the second blue peak of the light source and the peak wavelength of the first blue peak of the light source is greater than or equal to 10 nanometers.

In some exemplary embodiments, the peak wavelength of the first blue peak of the light source is about 445 nm, and the peak wavelength of the second blue peak of the light source is about 460 nm.

In some exemplary embodiments, the peak wavelength of the transmittance spectrum of the first blue sub-pixel is about 438 nm, and a half-peak width is about 52 nm; the peak wavelength of the transmittance spectrum of the second blue sub-pixel is about 467 nm, and a half-peak width is about 49 nm.

In some exemplary embodiments, the red sub-pixel, the green sub-pixel, the first blue sub-pixel and the second blue sub-pixel in the pixel unit have a same size.

In some exemplary embodiments, the red sub-pixel, the green sub-pixel, the first blue sub-pixel and the second blue sub-pixel are disposed in parallel along a first direction, and adjacent sub-pixels are disposed at intervals; wherein the first direction is a length direction or a width direction of the color filter substrate.

In some exemplary embodiments, the light source includes a first light-emitting chip and a second light-emitting chip connected in series; a light-emitting wavelength band of the first light-emitting chip is different from a light-emitting wavelength band of the second light-emitting chip.

In some exemplary embodiments, the light source is a side-incidence type of back light source or a straight down type of back light source.

In some exemplary embodiments, the array substrate and the color filter substrate are sequentially stacked, and the back light module is located on one side of the array substrate away from the color filter substrate.

In some exemplary embodiments, a liquid crystal layer is provided between the color filter substrate and the array substrate.

In some exemplary embodiments, the color filter substrate includes a color filter base substrate and a color filter layer disposed on the color filter base substrate, and the color filter layer faces the array substrate.

In some exemplary embodiments, the array substrate includes multiple gate lines and multiple data lines, wherein the multiple gate lines and the multiple data lines cross with each other to define multiple sub-pixel regions; a pixel electrode, a common electrode and a drive circuit connected to the pixel electrode are disposed in each sub-pixel region, and the drive circuit includes at least one thin film transistor.

In another aspect, an embodiment of the present disclosure provides a display apparatus including any of the above display panels.

Other aspects will become apparent after the drawings and the detailed description are read and understood.

BRIEF DESCRIPTION OF DRAWINGS

Accompanying drawings are used to provide a further understanding of technical solutions of the present disclosure and constitute a part of the description. They are used for explaining the technical solutions of the present disclosure together with embodiments of the present application and do not constitute a limitation on the technical solutions of the present disclosure. Shapes and sizes of one or more components in the accompanying drawings do not reflect real scales, and are only for a purpose of schematically illustrating contents of the present disclosure.

DETAILED DESCRIPTION

Multiple embodiments are described in the present disclosure, but the description is exemplary rather than restrictive, and it is apparent to those of ordinary skills in the art that there may be more embodiments and implementation solutions within the scope of the embodiments described in the present disclosure. Although many possible combinations of features are shown in the drawings and discussed in the embodiments, many other combinations of the disclosed features are also possible. Unless specifically limited, any feature or element of any embodiment may be used in combination with or in place of any other feature or element of any other embodiment.

The present disclosure includes and contemplates combinations of features and elements known to those of ordinary skilled in the art. The disclosed embodiments, features and elements of the present disclosure may be combined with any conventional feature or element to form a unique solution defined by the claims. Any feature or element of any embodiment may also be combined with a feature or an element from another solution to form another unique solution defined by the claims. Therefore, it should be understood that any of the features shown and discussed in the present disclosure may be implemented individually or in any suitable combination. Therefore, the embodiments are not otherwise limited except in accordance with the appended claims and equivalents thereof. In addition, one or more modifications and alterations may be made within the protection scope of the appended claims.

Furthermore, when describing representative embodiments, the specification may have presented a method or process as a specific sequence of steps. However, to the extent that the method or process does not depend on the specific order of steps described in the embodiments of the present disclosure, the method or the process should not be limited to the specific order of steps described. As those of ordinary skills in the art will understand, other orders of steps are also possible. Therefore, the specific order of steps set forth in the specification should not be interpreted as limiting the claims. Furthermore, the claims for the method or process should not be limited to performing the steps in the described order of its steps, and those skilled in the art may easily understand that these orders may be varied but still remain within the essence and scope of the embodiments of the present disclosure.

In the drawings, a size of a constituent element, or a thickness of a layer or an area, is sometimes exaggerated for clarity. Therefore, an implementation of the present disclosure is not necessarily limited to the size shown, and a shape and size of each component in the drawings do not reflect true scales. In addition, the drawings schematically show ideal examples, and an implementation of the present disclosure is not limited to the shapes or numerical values shown in the drawings.

Unless otherwise defined, technical terms or scientific terms used in the present disclosure shall have common meanings understood by those of ordinary skills in the art to which the present disclosure pertains. The wordings "first", "second" and the like used in the present disclosure do not indicate any order, quantity or importance, but are only used to distinguish different components. In the present disclosure, "multiple" may mean two or more than two. Similar words such as "including" or "containing" mean that elements or articles appearing before the word cover elements or articles listed after the word and their equivalents, without excluding other elements or articles. Similar terms such as "couple", "connect" or "link" are not limited to physical or mechanical connections, but may include electrical connections, whether direct or indirect. "Electrical connection" includes a case where constituent elements are connected together through an element having a certain electric effect. The "element having the certain electrical effect" is not particularly limited as long as it can transmit and receive electrical signals between the connected constituent elements. Examples of "the element having the certain electrical effect" not only include electrodes and wirings, but also switching elements such as a transistor, a resistor, an inductors, a capacitor, and other elements with one or more functions.

In the present disclosure, a transistor refers to an element including at least three terminals, namely, a gate electrode, a drain electrode and a source electrode. The transistor has a channel region between the drain electrode (a drain electrode terminal, a drain electrode region or a drain electrode) and the source electrode (a source electrode terminal, a source electrode region or a source electrode), and current can flow through the drain electrode, the channel region and the source electrode. In the present disclosure, the channel region refers to a region through which the current mainly flows.

In the present disclosure, "about" means that there is no strict limit for a value, and values within an error range during processes and measurement are allowed.

In order to make the following description of the embodiments of the present disclosure clear and concise, detailed description of some of known functions and known components are omitted in the present disclosure. The drawings of the embodiments of the present disclosure only relate to structures involved in the embodiments of the present disclosure, and for other structures, general designs may be referred to.

With the continuous progress of the display technology, users' demands for display apparatuses are also increasing. For example, a light source used in a back light module of a liquid crystal display panel is generally excited by a chip with short-wave high-energy blue light below 450 nanometers (nm). The short-wave blue light is directly projected to retinas through crystalline lenses of human eyes, which will cause irreversible damage to human eyes after long-term use. Therefore, at present, users in the fields of medical treatment, video games, etc. have gradually put forward demands for healthy eye protection display, demanding a solution to the visual fatigue caused by doctors' long-term reading and long-term focus on display products required by professional competitive sports, and thus derived a concept of eye protection with low blue light. The current low blue light technology mainly includes the following two solutions: reducing intensity of blue light, and using a long-wave light source or a wavelength conversion thin film to change the blue light band so that a main peak of the blue light shifts to red. However, reducing the intensity of blue light will also reduce the color temperature which brings about the problem of yellowing of display; a mode excited by long-wave blue light will cause blue color points to drift, resulting in a decrease in blue purity and color gamut due to the low energy of long-wave blue light.

At least one embodiment of the present disclosure provides a display panel and a display apparatus, which can reduce harmful blue light components, achieving eye protection with low blue light while increasing blue purity, improving the color gamut of the display panel, and enhancing the expression of color.

An embodiment of the present disclosure provides a display panel, including an array substrate, a color filter substrate, and a back light module. The back light module includes a light source, wherein a light emission spectrum of the light source has a first blue peak and a second blue peak, and a peak wavelength of the first blue peak is smaller than a peak wavelength the second blue peak. The color filter substrate is provided with multiple pixel units which are periodically and repeatedly disposed, and at least one pixel unit includes a red sub-pixel, a green sub-pixel, a first blue sub-pixel and a second blue sub-pixel. The first blue sub-pixel and the second blue sub-pixel have different transmittance spectrums. A peak wavelength of a transmittance spectrum of the first blue sub-pixel matches the peak wavelength of the first blue peak of the light source, and a peak wavelength of a transmittance spectrum of the second blue sub-pixel matches the peak wavelength of the second blue peak of the light source. The transmittance of the first blue sub-pixel for light of the first wavelength band is smaller than the transmittance of the second blue sub-pixel for light of the second wavelength band.

According to the display panel provided by the present embodiment, by configuring the peak wavelength of the transmittance spectrum of the first blue sub-pixel to match the peak wavelength of the first blue peak of the light source, configuring the peak wavelength of the transmittance spectrum of the second blue sub-pixel to match the peak wavelength of the second blue peak of the light source, and configuring the transmittance of the first blue sub-pixel for the light of the first wavelength band to be smaller than the transmittance of the second blue sub-pixel for the light of the second wavelength band, less light of the first wavelength band (i.e., short-wave blue light) and more second-band light (i.e., long-wave blue light) can be emitted at the same time, which not only ensures the display effect of the display panel, but also reduces the emission of harmful blue light, and achieving the demand for low blue light. Furthermore, the pixel unit is improved to include a red sub-pixel (R), a green sub-pixel (G), a first blue sub-pixel (B1) and a second blue sub-pixel (B2), so as to creates a quadrilateral area of RGB1B2 color gamut of the display panel that is much larger than a triangular area of RGB color gamut of a conventional display panel, thus significantly improving the display color gamut and increasing the expression of color. The display panel of the present embodiment has wide application range and good popularization.

In some exemplary embodiments, the peak wavelength of the transmittance spectrum of the first blue sub-pixel matching the peak wavelength of the first blue peak of the light source, and the peak wavelength of the transmittance spectrum of the second blue sub-pixel matches the peak wavelength of the second blue peak of the light source includes that: the peak wavelength of the transmittance spectrum of the first blue sub-pixel is less than or equal to the peak wavelength of the first blue peak of the light source and greater than or equal to a first set value, wherein the first set value is a difference between the peak wavelength of the first blue peak of the light source and 10 nanometers; and the peak wavelength of the transmittance spectrum of the second blue sub-pixel is greater than or equal to the peak wavelength of the second blue peak of the light source and less than or equal to a second set value, wherein the second set value is a sum of the peak wavelength of the second blue peak of the light source and 10 nanometers. In other words, the peak wavelength of the transmittance spectrum of the first blue sub-pixel ranges from the first set value to the peak wavelength of the first blue peak of the light source, and the peak wavelength of the transmittance spectrum of the second blue sub-pixel ranges from the peak wavelength of the second blue peak to the second set value. However, this is not limited in the present embodiment.

In some exemplary embodiments, a ratio of the transmittance of the first blue sub-pixel for the light of the first wavelength band to the transmittance of the second blue sub-pixel for the light of the second wavelength band is less than or equal to 0.4. The display panel provided by this exemplary embodiment can meet the demand for low blue light.

In some exemplary embodiments, the ratio of the transmittance of the first blue sub-pixel for the light of the first wavelength band to the transmittance of the second blue sub-pixel for the light of the second wavelength band ranges from 0.1 to 0.2. The display panel provided by this exemplary embodiment can meet the demand for low blue light and improve the display color gamut.

In some exemplary embodiments, a red sub-pixel, a green sub-pixel, a first blue sub-pixel and a second blue sub-pixel in a pixel unit have a same size. For example, the size of the pixel unit according to the present embodiment may be the same as the size of a pixel unit on a conventional color filter substrate, and the sizes of the four sub-pixels in the pixel unit are the same. However, this is not limited in the present embodiment.

In some exemplary embodiments, a red sub-pixel, a green sub-pixel, a first blue sub-pixel and a second blue sub-pixel in a pixel unit are disposed in parallel along a first direction, and adjacent sub-pixels are disposed at intervals. The first direction is a length direction or a width direction of a color filter substrate. In some examples, the first blue sub-pixel is adjacent to the green sub-pixel, or the second blue sub-pixel is adjacent to the green sub-pixel. However, arrangement mode of the four sub-pixels in the pixel unit is not limited in the present embodiment.

In some exemplary embodiments, a difference between the peak wavelength of the second blue peak of the light source and the peak wavelength of the first blue peak of the light source is greater than or equal to 10 nanometers (nm). By setting the difference between the peak wavelengths of the two blue peaks of the light source, a difference between the peak wavelengths of the transmittance spectrums of the two blue sub-pixels can be adjusted to support the improvement of the display color gamut. Here, the greater the difference between the two blue peaks of the light source, the larger the adjustment range of color coordinates of a blue picture.

In some exemplary embodiments, the peak wavelength of the first blue peak of the light source is about 445 nm, and the peak wavelength of the second blue peak of the light source is about 460 nm. However, this is not limited in the present embodiment. For example, the peak wavelengths of the two blue peaks of the light source of the back light module may range from 445 nm to 460 nm.

In some exemplary embodiments, the transmittance spectrum of the first blue sub-pixel has a peak wavelength of about 438 nm and a half-peak width of about 52 nm; and the transmittance spectrum of the second blue sub-pixel has a peak wavelength of about 467 nm and a half-peak width of about 49 nm. In this exemplary embodiment, the transmittance spectrum of the first blue sub-pixel is in a harmful blue light band, which can be used to filter out harmful blue light, and the transmittance spectrum of the second blue sub-pixel is in a harmless blue light band, which can be used to display blue pictures normally. Through the cooperation of the first blue sub-pixel and the second blue sub-pixel, the demand for low blue light can be achieved.

In some exemplary embodiments, the light source of the back light module includes a first light-emitting chip and a second light-emitting chip connected in series. A light-emitting wavelength band of the first light-emitting chip is different from a light-emitting wavelength band of the second light-emitting chip. In this exemplary embodiment, by adopting two light-emitting chips with different wavelength bands in series, the spectrum of the light source with two distinct blue peaks can be achieved.

In some exemplary embodiments, the light source may be used as a side-incidence type back light, or the light source may be used as a straight down type back light. For example, the light source includes a Light-Emitting Diode (LED). The incidence position of the light source is not limited in the present exemplary embodiment.

In some exemplary embodiments, the array substrate and the color filter substrate are sequentially stacked, and the back light module is located on one side of the array substrate away from the color filter substrate. However, the layering relation between the array substrate and the color filter substrate is not limited in the present embodiment.

The display panel according to the present embodiment will be illustrated by some examples below.

Figure 1:
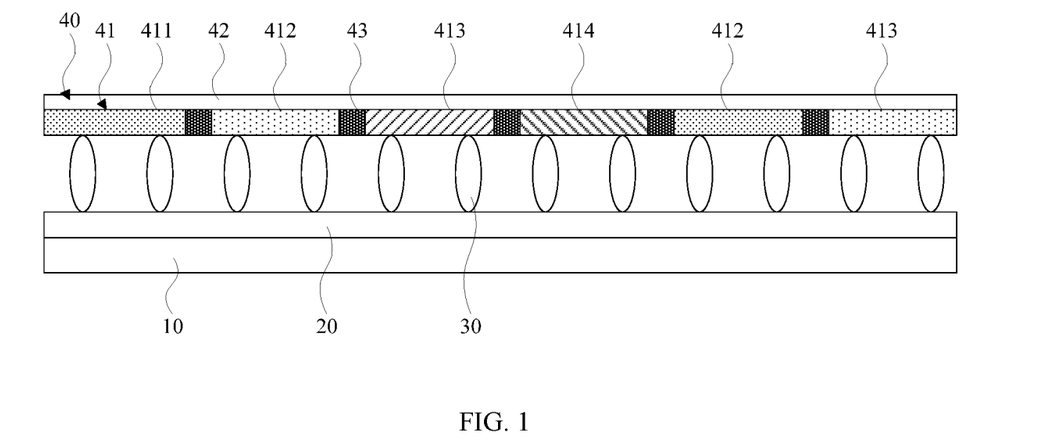
FIG. 1 is a schematic diagram of a structure of a display panel according to at least one embodiment of the present disclosure.

FIG. 1 is a schematic diagram of a structure of a display panel according to at least one embodiment of the present disclosure. In some exemplary embodiments, as shown in FIG. 1, the display panel according to the present exemplary embodiment includes a back light module 10, an array substrate 20, and a color filter substrate 40 which are sequentially stacked, and a liquid crystal layer 30 is disposed between the array substrate 20 and the color filter substrate 40. The display panel according to the present embodiment is a liquid crystal display panel, which drives the torsion of liquid crystal molecules by an electric field to make light transmit selectively to present images with different gray scales. In some examples, the electric field that drives the torsion of the liquid crystal molecules is formed between a pixel electrode and a common electrode formed on an array substrate. However, this is not limited in the present embodiment. For example, the pixel electrode may be formed on the array substrate, and the common electrode may be formed on the color filter substrate. The layering relation between the array substrate and the color filter substrate is not limited in the present embodiment.

In some exemplary embodiments, the back light module 10 can supply sufficient brightness and uniformly distributed light sources to the display panel for normal image display. The back light module 10 adopts an LED as a light source. According to an incident position of the light source, back light modules may be divided into two types: side-incidence type and straight down type. For example, for a side-incidence type back light module, multiple LEDs may be disposed at intervals on a side of a light guide plate. The side-incidence type back light module may further include a back plate, a reflective sheet, a light guide plate and an optical film. Or, the straight down type back light module may include a back plate, a light source, a diffusion plate, an optical film and other structures. The structure of the back light module is not limited in the embodiment. Those skilled in the art can easily understand the structure of the back light module, which will not be repeated here for brevity.

In some examples, an LED serving as a light source may include a blue chip and phosphors. The LED blue light chip may include a first light-emitting chip and a second light-emitting chip connected in series, wherein an light-emitting wavelength band of the first light-emitting chip is different from an light-emitting wavelength band of the second light-emitting chip. For example, the first light-emitting chip controls to emit light of a first wavelength band, and the second light-emitting chip controls to emit light of a second wavelength band. For example, the light of the first wavelength band has a wavelength less than 455 nm, and the light of the second wavelength band has a wavelength greater than or equal to 455 nm. In the LED of this example, light-emitting chips with different wavelength bands is encapsulated in series, so that light-emitting spectrum of the LED has two distinct blue peaks, and an absolute value of the difference between the peak wavelengths of the two blue peaks is greater than or equal to 10 nm. Here, the greater the difference between the two blue peaks, the larger the adjustment range of color coordinates of a blue picture. However, the light emission spectrum of the conventional single-chip LED or double-crystal LED using chips of the same band only has one blue peak, which cannot support the color coordinate adjustment of blue picture. However, this is not limited in the present embodiment. For example, a three-color LED chip may be adopted as the light source.

Figure 2:
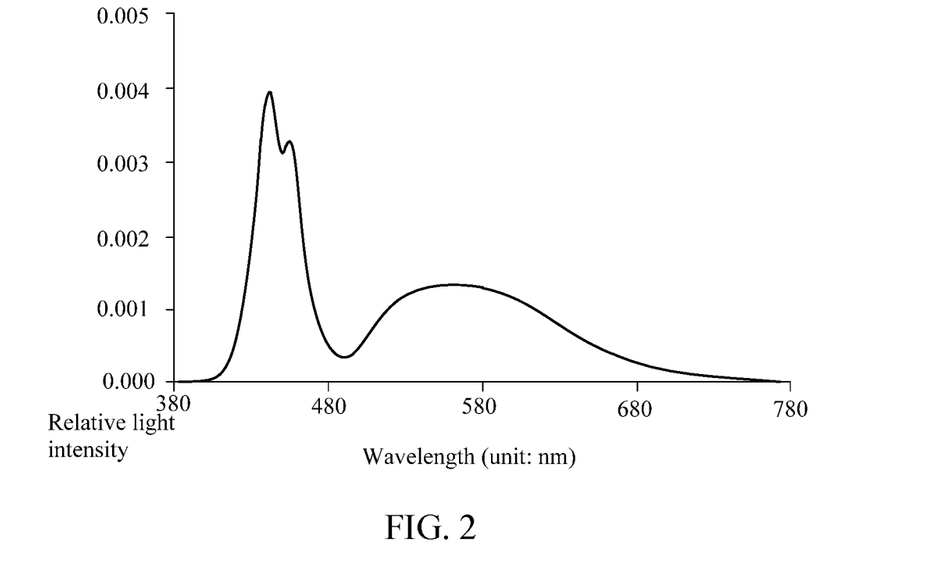
FIG. 2 is a light emission spectrum of a light source of a back light module according to at least one embodiment of the present disclosure.

In some examples, in order to improve the difference between the two blue peaks to the greatest extent, the light emitted by the first light-emitting chip of the LED may be controlled to have a wavelength of about 445 nm, and the light emitted by the second light-emitting chip may be controlled to have a wavelength of about 460 nm. The light emission spectrum of the LED of this example may be as shown in FIG. 2, in which two blue peaks are formed in the range of the blue wavelength band, with a first peak (i.e., a first blue peak) appearing at 445 nm in short-wave and a second peak (i.e., a second blue peak) appearing at 460 nm in long-wave. For the manufacturing process of the LED in this example, the manufacturing processes of the conventional dual-crystal LED of the same wavelength band may be referred to, which will not be described in detail here.

In some exemplary embodiments, the array substrate 20 may include multiple gate lines and multiple data lines, wherein the multiple gate lines and the multiple data lines may cross to define multiple sub-pixel regions. A pixel electrode, a common electrode and a drive circuit connected with the pixel electrode may be disposed in each sub-pixel area. The drive circuit may include at least one thin film transistor. For example, a drain electrode of the thin film transistor may be electrically connected to the pixel electrode, a source electrode of the thin film transistor may be electrically connected to a data line, and a gate electrode of the thin film transistor may be electrically connected to a gate line. The on/off of the thin film transistor is controlled by a scanning signal transmitted by the gate line, and a pixel voltage transmitted by the data line is output to the pixel electrode through the drive circuit. The common electrode is connected to a common voltage wire. An electric field for driving liquid crystal molecules to deflect is formed between the pixel electrode and the common electrode, thereby achieving the display of a specific gray scale. However, the structure of the array substrate is not limited in the present embodiment. For example, the common electrode may be disposed on the color filter substrate instead of on the array substrate.

In some exemplary embodiments, as shown in FIG. 1, the color filter substrate 40 is a structure for cooperating with the array substrate 20 for light filtering to achieve the structure of the screen display. A color filter substrate 40 and an array substrate 20 are disposed in sequence, and a liquid crystal layer 30 is provided between the color filter substrate 40 and the array substrate 20. The color filter substrate 40 includes a color filter base substrate 42 and a color filter layer 41 disposed on the color filter base substrate 42. The color filter layer 41 faces the array substrate 20. The color filter layer 41 is a filter film layer, which converts white light emitted by the light source in the back light module 10 to perform image display by emitting light of a set color.

In some exemplary embodiments, as shown in FIG. 1, the color filter layer 41 is divided into multiple pixel units that are periodically and repeatedly disposed. At least one pixel unit includes a red sub-pixel 411, a green sub-pixel 412, a first blue sub-pixel 413, and a second blue sub-pixel 414. In this embodiment, the conventional setting of the three primary colors of the pixel unit is changed, and a new setting of the three primary colors is formed, so that the light emitted by the light source in the back light module can also emit mixed white light after passing through the color filter layer.

In some exemplary embodiments, the size of the pixel unit according to the present embodiment may be set according to a pixel unit of a conventional display panel to ensure the resolution of the display panel. Furthermore, sizes of the red sub-pixel 411, the green sub-pixel 412, the first blue sub-pixel 413, and the second blue sub-pixel 414 may be set to be the same. In other words, the red sub-pixel 411, the green sub-pixel 412, the first blue sub-pixel 413 and the second blue sub-pixel 414 constitute one pixel unit, and each sub-pixel can occupy a quarter of the area of the pixel unit to ensure that light emitted after color mixing is still white.

In some exemplary embodiments, in order to ensure independence of the light emission of the sub-pixels, the red sub-pixel 411, the green sub-pixel 412, the first blue sub-pixel 413 and the second blue sub-pixel 414 may be disposed according to the standard RGB arrangement. The arrangement of the four sub-pixels in each pixel unit may be the same. Adjacent sub-pixels are disposed at intervals.

Figure 3A:
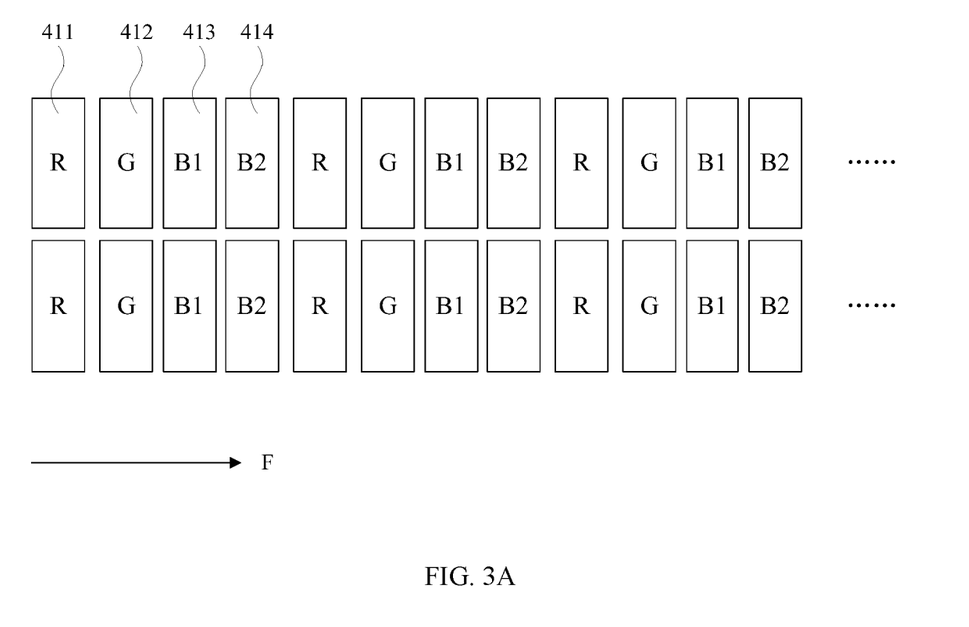
FIG. 3A is a schematic diagram of a structure of a color filter layer of a display panel according to at least one embodiment of the present disclosure.

In some examples, as shown in FIG. 3A, a left-right direction in the figure represents a direction of the length of the display panel, and an up-down direction represents a direction of the width of the display panel. The red sub-pixel 411, the green sub-pixel 412, the first blue sub-pixel 413 and the second blue sub-pixel 414 are disposed side by side along a first direction F (that is, the direction of the length of the display panel), that is, left to right or right to left in the figure. Positions of the first blue sub-pixel 413 and the second blue sub-pixel 414 are interchangeable. However, this is not limited in the present embodiment.

Figure 3B:
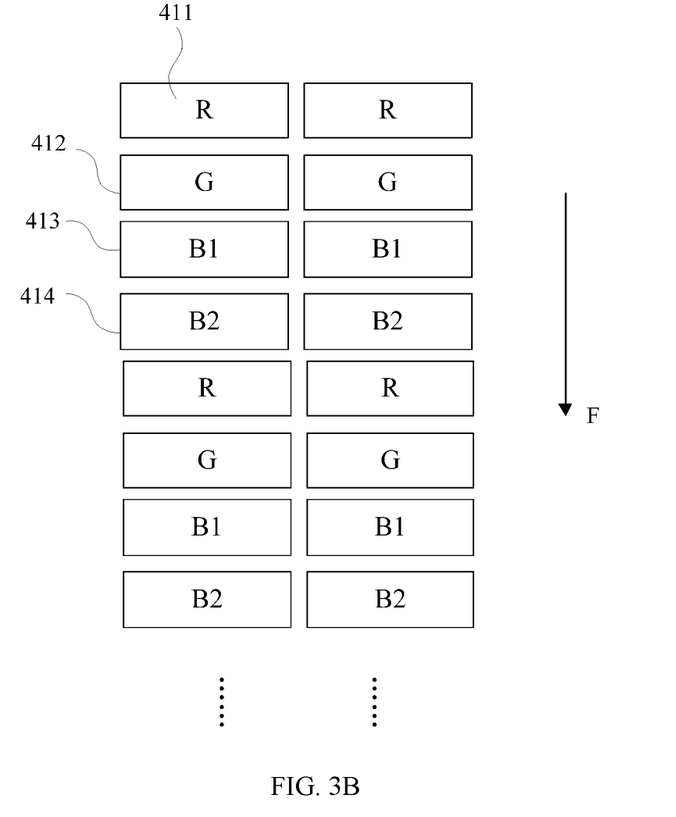
FIG. 3B is another schematic diagram of a structure of a color filter layer of a display panel according to at least one embodiment of the present disclosure.

In some examples, as shown in FIG. 3B, the left-right direction is taken as the direction of the length of the display panel, and the up-down direction is taken as the direction of the width of the display panel. The red sub-pixel 411, the green sub-pixel 412, the first blue sub-pixel 413 and the second blue sub-pixel 414 may be disposed side by side along the first direction F of the display panel (that is, the direction of the width of the display panel), that is, from top to bottom or from bottom to top in the figure. The positions of the first blue sub-pixel 413 and the second blue sub-pixel 414 are interchangeable. However, this is not limited in the present embodiment.

In some examples, as shown in FIG. 1, the color filter substrate 40 may further include a black matrix layer 43, and the interval arrangement of adjacent sub-pixels can be achieved by the black matrix layer 43. The black matrix layer 43 is disposed on one side of the color filter substrate 40 facing the array substrate 20, and the black matrix layer 43 divides the color filter substrate 40 into several sub-regions, each of which corresponds to one sub-pixel. In other words, the black matrix layer 43 divides the color filter substrate 40 into several sub-regions distributed in a grid shape, wherein each sub-region may be coated with a color resist material to form a red sub-pixel 411, a green sub-pixel 412, a first blue sub-pixel 413 and a second blue sub-pixel 414 of the color filter layer 41. The preparation method of the color filter substrate is easily understood and achieved by those skilled in the art, so it will not be described in detail here.

In some exemplary embodiments, the first blue sub-pixel 413 and the second blue sub-pixel 414 have different transmittance spectrums, a peak wavelength of the transmittance spectrum of the first blue sub-pixel 413 matches a peak wavelength of the first blue peak of the LED, and a peak wavelength of the transmittance spectrum of the second blue sub-pixel 414 matches a peak wavelength of the second blue peak of the LED. The transmittance of the first blue sub-pixel 413 for light of the first wavelength band is smaller than the transmittance of the second blue sub-pixel for light of the second wavelength band. The first band is where short-wave blue light is located, and the second band is where long-wave blue light is located. The first blue sub-pixel 413 can transmit short-wave blue light, and the second blue sub-pixel 414 can transmit long-wave blue light, which can be achieved by selection and use of different types of color filter materials. The transmittance of the first blue sub-pixel 413 for short-wave blue light and the transmittance of the second blue sub-pixel 414 for long-wave blue light can be achieved by adjusting the driving voltage, for example, by adjusting a common electrode voltage (Vcom) of the sub-pixel.

In some examples, the transmittance of the first blue sub-pixel 413 and the second blue sub-pixel 414 for different wavelength bands of blue light can be changed through the color resist material forming a color film of the sub-pixels. Main components of the color resist material include resin/polymer, which enables the color resist material to have etching resistance; a solvent, which keeps the color resist material in a liquid state and makes it convenient for coating; a photoactive substance (PAC), which controls the color resist material to be sensitive to light with a specific wavelength, electron beam or ion beam, etc., and produce corresponding chemical reaction; additives, which change some characteristics of the color resist material, such as controlling light absorption rate, solubility, etc. The transmittance of the color resist material can be adjusted by the composition ratio of the photoactive substances (PAC) and additives. However, this is not limited in the present embodiment.

Figure 4:
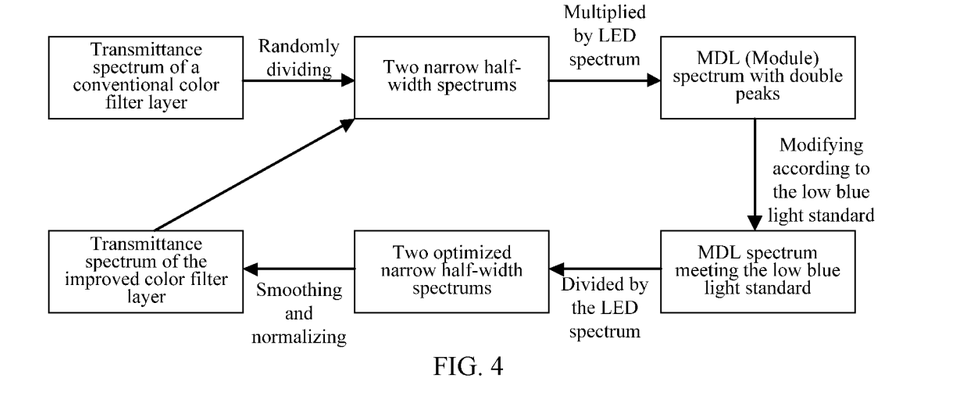
FIG. 4 is a schematic diagram of a calculation method of a transmittance spectrum of a color filter layer according to at least one embodiment of the present disclosure.

The transmittance spectrum of the first blue sub-pixel 413 and the transmittance spectrum of the second blue sub-pixel 414 of the color filter layer 41 of the display panel according to the exemplary embodiment may be determined with reference to the calculation method shown in FIG. 4. As shown in FIG. 4, the transmittance spectrum of the blue sub-pixel of the color filter layer of the conventional display panel may be randomly divided into two narrow half-width spectrums. Then, the two narrow half-width spectrums are multiplied by the spectrum of the LED as the light source to obtain a MDL (Module) spectrum with double peaks. Secondly, the obtained MDL spectrum is modified according to a low blue light standard to obtain an MDL spectrum meeting the low blue light standard. Two optimized narrow half-width spectrums can be obtained by dividing the MDL spectrum meeting the low blue light standard by the LED spectrum. After smoothing and normalizing the optimized two narrow half-width spectrums, the transmittance spectrums of the first blue sub-pixel and the second blue sub-pixel of the improved color filter layer can be obtained. The calculation process shown in FIG. 4 can be cycled several times to obtain the final transmittance spectrum of the first blue sub-pixel and the second blue sub-pixel of the improved color filter layer. However, this is not limited in the present embodiment.

In some examples, a low blue light standard according to TUV (Technischen Uberwachungs Vereine) Rheinland Group includes: the power of low-frequency blue light with a band range of 415 nm to 455 nm should account for less than 50% of the optical power in the range of 400 nm to 500 nm. In the low blue light mode, the correlated color temperature (CCT) should be between 5500K and 7000K. If the proportion of the low-frequency blue light is less than 5%, the requirement on CCT range is no longer applicable. Among them, the CCT can be achieved by adjusting an LED color block (i.e., the regional range of color temperature), so it will not be repeated here.

Figure 5:
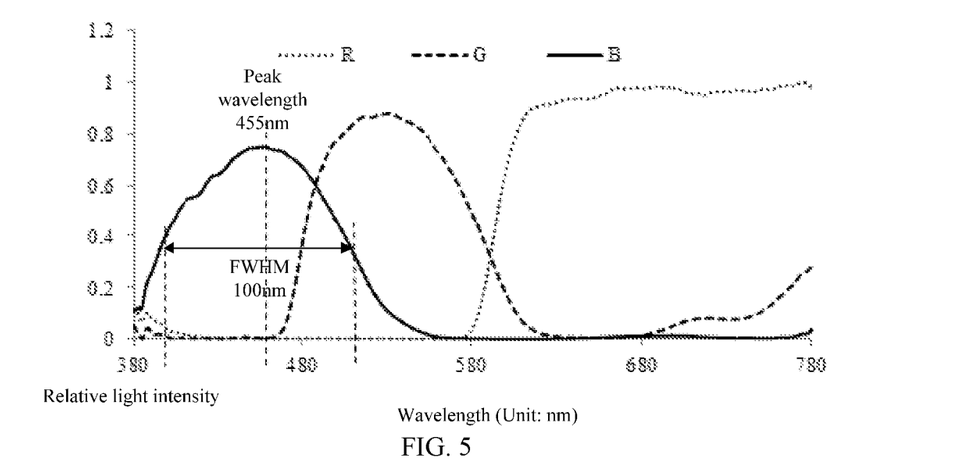
FIG. 5 is a transmittance spectrogram of a color filter layer of a display panel.

In some examples, the color filter layer of the conventional display panel may include multiple pixel units disposed periodically, and each pixel unit may include three sub-pixels (i.e., red sub-pixel, green sub-pixel and blue sub-pixel) disposed according to the standard RGB arrangement. FIG. 5 is a transmittance spectrogram of a color filter layer of a display panel. As shown in FIG. 5, a peak wavelength of the transmittance spectrum of the blue sub-pixel of the color filter layer of the display panel is 455 nm, and a full width at half maxima (FWHM) is 100 nm.

Figure 6:
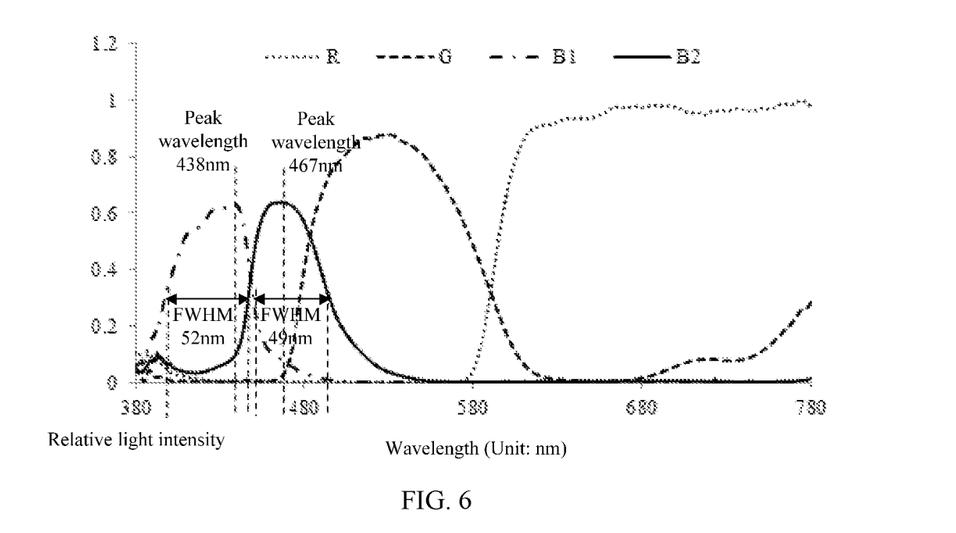
FIG. 6 is a transmittance spectrogram of a color filter layer of a display panel according to at least one embodiment of the present disclosure.

FIG. 6 is a transmittance spectrogram of a color filter layer of a display panel according to at least one embodiment of the present disclosure. In some examples, the transmittance spectrogram shown in FIG. 5 is combined with the LED spectrogram shown in FIG. 2, and by referring to the calculation process shown in FIG. 4, the transmittance spectrogram shown in FIG. 6 can be obtained. As shown in FIG. 6, a peak wavelength of the transmittance spectrum of the first blue sub-pixel is about 438 nm, and the FWHM is about 52 nm. A peak wavelength of the transmittance spectrum of the second blue sub-pixel is about 467 nm, and the FWHM is about 49 nm. There is a difference of about 30 nm between the peak wavelength of the first blue sub-pixel and the peak wavelength of the second blue sub-pixel, and the FMHW of the first blue sub-pixel and the FMHW of the second blue sub-pixel is about ½ of the FWHM of the blue sub-pixel of the display panel shown in FIG. 5.

In this exemplary embodiment, referring to the low blue light certification standard of the TUV Rheinland Group, blue light with wavelength less than 455 nm (i.e., short-wave blue light) is defined as harmful blue light, and blue light with wavelength greater than or equal to 455 nm (i.e., long-wave blue light) is defined as harmless blue light. The transmittance spectrum of the first blue sub-pixel is in the harmful blue light band, and the transmittance spectrum of the second blue sub-pixel is not in the harmful blue light band (i.e., harmless blue light band). The first blue sub-pixel can transmit short-wave blue light, and the second blue sub-pixel can transmit long-wave blue light. By controlling the transmittance of the first blue sub-pixel for short-wave blue light and the transmittance of the second blue sub-pixel for long-wave blue light, not only the normal display effect of the display surface can be ensured, the emission of harmful blue light can be reduced, and the demand for low blue light can be achieved.

Figure 7:
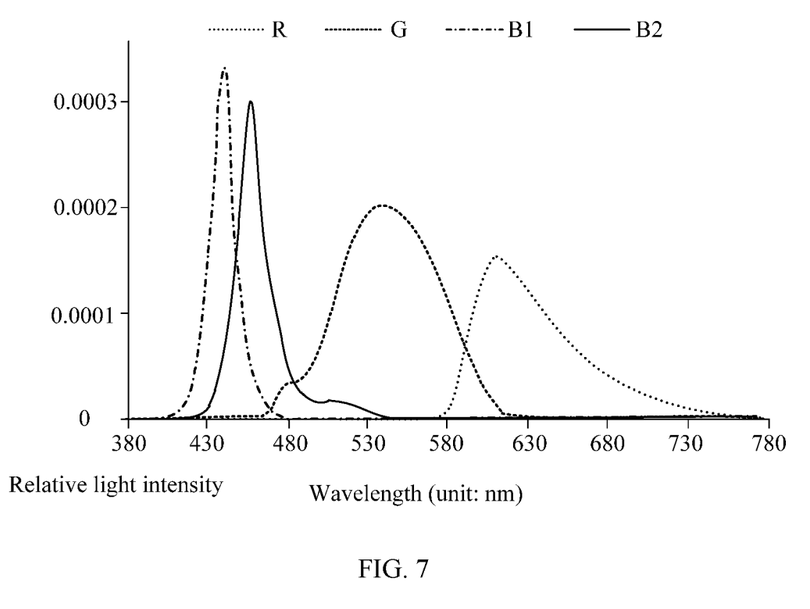
FIG. 7 is a spectrogram of a module of a display panel according to at least one embodiment of the present disclosure.
Figure 8:
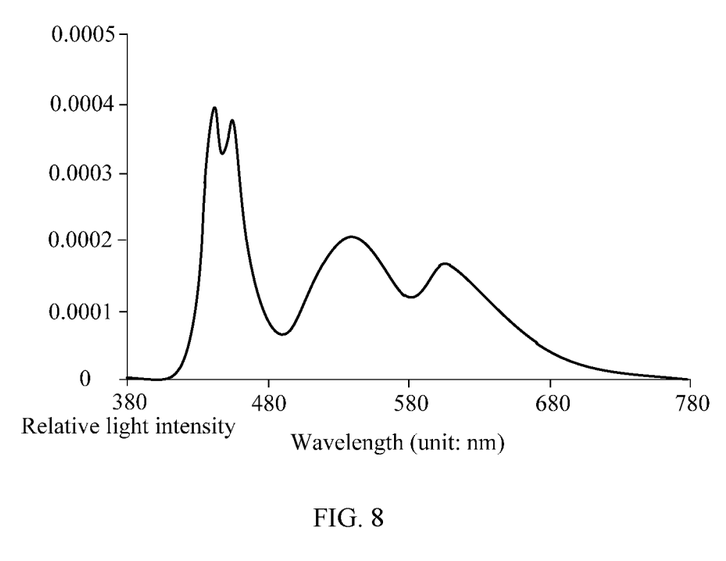
FIG. 8 is a white light spectrogram of a module of a display panel according to at least one embodiment of the present disclosure.

In some exemplary embodiments, the MDL spectrum is formed by stacking the LED spectrum and the transmittance spectrum of the color filter layer. For example, by multiplying the LED spectrum shown in FIG. 2 with the transmittance spectrum of four sub-pixels (RGB1B2) of the color filter layer shown in FIG. 6, the MDL spectrums when R, G, B1 and B2 are turned on separately can be obtained, as shown in FIG. 7. When all sub-pixels are turned on, the MDL white light spectrum can be obtained by adding the MDL spectrum when R, G, B1 and B2 are turned on separately, which are as shown in FIG. 8. Color coordinates of red light, green light, first blue light and second blue light can be calculated by the MDL spectrums as shown in FIG. 7.

In some exemplary embodiments, it can be seen from the MDL spectrum shown in FIG. 8 that energy of the harmful blue light is mainly controlled by the first blue sub-pixel (B1) of the color filter layer, and the transmittance of the first blue sub-pixel of the color filter layer for the harmful blue light can be reduced by adjusting the common electrode voltage (Vcom) of the first blue sub-pixel, thereby effectively reducing the proportion of the harmful blue light. Table 1 records results of the ratio of harmful blue light under the transmittance of the first blue sub-pixel for short-wave blue light and the transmittance of the second blue sub-pixel for long-wave blue light in different proportions.

TABLE 1

| B1 | B2 | Bx | By | sRGB matching rate | B-Area matching rate | Harmful blue light ratio |
|---|---|---|---|---|---|---|
| 0 | 1 | 0.143 | 0.062 | 97.6% | 97.1% | 35.4% |
| 0.1 | 1 | 0.145 | 0.058 | 97.9% | 98.9% | 39.5% |
| 0.2 | 1 | 0.145 | 0.055 | 97.8% | 98.9% | 43.0% |
| 0.3 | 1 | 0.147 | 0.052 | 97.2% | 97.4% | 46.0% |
| 0.4 | 1 | 0.148 | 0.049 | 96.8% | 96.7% | 48.7% |
| 0.5 | 1 | 0.149 | 0.047 | 97.0% | 94.9% | 51.1% |
| 0.6 | 1 | 0.15 | 0.045 | 96.1% | 93.8% | 53.2% |
| 0.7 | 1 | 0.151 | 0.043 | 95.6% | 92.6% | 55.1% |
| 0.8 | 1 | 0.152 | 0.042 | 95.4% | 91.9% | 56.9% |
| 0.9 | 1 | 0.152 | 0.041 | 95.3% | 91.5% | 58.4% |
| 1 | 1 | 0.153 | 0.039 | 94.9% | 90.4% | 59.9% |
| 1 | 0.9 | 0.153 | 0.038 | 94.8% | 90.4% | 60.9% |
| 1 | 0.8 | 0.154 | 0.037 | 94.6% | 89.3% | 61.9% |
| 1 | 0.7 | 0.154 | 0.035 | 94.5% | 89.0% | 63.1% |
| 1 | 0.6 | 0.155 | 0.033 | 94.3% | 87.9% | 64.5% |
| 1 | 0.5 | 0.156 | 0.031 | 93.8% | 86.8% | 66.0% |
| 1 | 0.4 | 0.157 | 0.029 | 93.4% | 86.0% | 67.7% |
| 1 | 0.3 | 0.158 | 0.027 | 93.0% | 84.9% | 69.6% |
| 1 | 0.2 | 0.16 | 0.023 | 92.4% | 82.7% | 71.9% |
| 1 | 0.1 | 0.161 | 0.02 | 92.0% | 81.6% | 74.5% |
| 1 | 0 | 0.163 | 0.015 | 91.3% | 79.4% | 77.6% |

In Table 1, the first column indicates the transmittance of the first blue sub-pixel for short-wave blue light, and the second column indicates the transmittance of the second blue sub-pixel for long-wave blue light. Bx, By represent the color coordinates of the emergent light.

It can be seen from Table 1 that when the ratio of the transmittance of the first blue sub-pixel for short-wave blue light and the transmittance of the second blue sub-pixel for long-wave blue light is 0.4:1, proportion of the harmful blue light is 48.7%, which is less than 50%, meeting the low blue light standard of TUV. When the ratio of the transmittance of the first blue sub-pixel for short-wave blue light to the transmittance of the second blue sub-pixel for long-wave blue light is less than 0.4, the proportion of the harmful blue light is less than 50%. As the ratio of the transmittance of the first blue sub-pixel for short-wave blue light to the transmittance of the second blue sub-pixel for long-wave blue light gradually increases, the proportion of the harmful blue light gradually increases. Therefore, in this example, the low blue light standard of TUV can be met when the ratio of the transmittance of the first blue sub-pixel for short-wave blue light to the transmittance of the second blue sub-pixel for long-wave blue light is less than or equal to 0.4.

Standard Red Green Blue (sRGB) is a color standard jointly developed by firms such as Microsoft, HP, Mitsubishi and Epson. The sRGB Matching Rate refers to the ratio of the overlapping area of the RGB color gamut triangle of the display panel of this exemplary embodiment and a sRGB standard triangle to the area of sRGB standard triangle. The sRGB standard color points are shown in table 2.

TABLE 2

| Gamut | SRGB standard color point | |
|---|---|---|
| Item | x | y |
| R | 0.64 | 0.33 |
| G | 0.3 | 0.6 |
| B | 0.15 | 0.06 |
| W | 0.3127 | 0.3290 |
| sRGB | 100% | |

In some examples, the red and green color coordinates of the display panel are determined by LED phosphors and red and green sub-pixels of the color filter layer, while the blue color coordinates are determined by the blue chip of LED and the blue sub-pixel of the color filter layer. Since the color filter layer in this exemplary embodiment adopts a first blue sub-pixel and a second blue sub-pixel, the blue color coordinate can be adjusted by adjusting the ratio of the transmittance of the first blue sub-pixel to the transmittance of the second blue sub-pixel.

Figure 9:
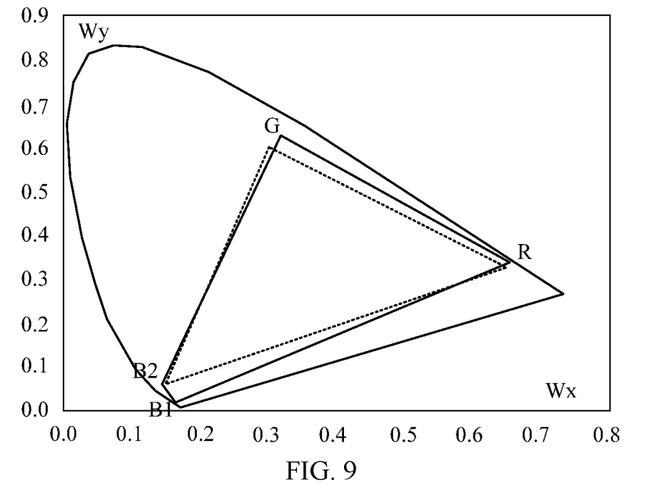
FIG. 9 is a schematic diagram of a calculation of an sRGB color gamut matching rate according to at least one embodiment of the present disclosure.

As shown in FIG. 9, the sRGB standard triangle and a quadrilateral composed of four color points (R, G, B1, B2) of red light, green light, first blue light and second blue light of the display panel according to the exemplary embodiment are drawn in the same chromaticity diagram. When a certain point in a connecting line between B1 point and B2 point is closest to the blue color coordinate in sRGB standard, the overlapping area between them is the largest, that is, the sRGB matching rate is the highest. In FIG. 9, dashed lines represent the sRGB standard triangle, and the quadrilateral marked by solid lines is composed of color points of the four sub-pixels of the display panel according to the exemplary embodiment.

In some examples, according to the calculation results in Table 1, when the ratio of the transmittance of the first blue sub-pixel for short-wave blue light to the transmittance of the second blue sub-pixel for long-wave blue light is 0.1:1, the sRGB matching rate is the highest, which reaches 97.9%, and the harmful blue light accounts for 39.5% at this time, which is less than 50%, and meets the low blue light standard of TUV.

Figure 10:
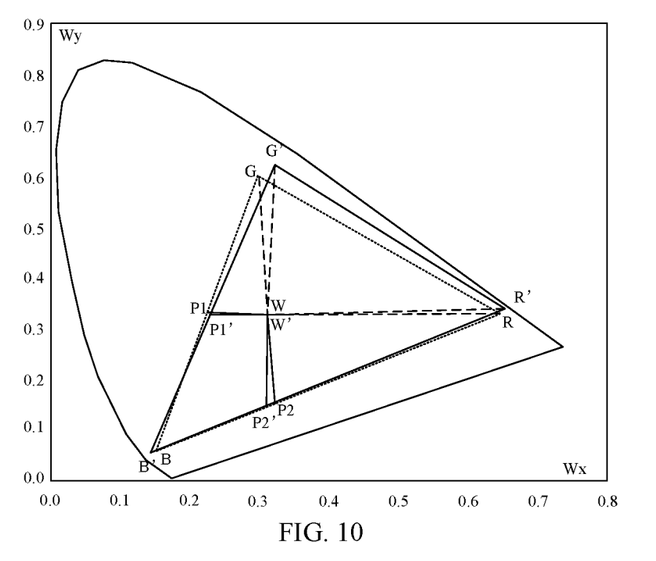
FIG. 10 is a schematic diagram of a calculation of a B-Area matching rate according to at least one embodiment of the present disclosure.

In some examples, B-Area is used to represent blue expression capability. As shown in FIG. 10, the standard color points R, G, B and W of SrGB standard are known. A line connecting the two points of R and W extends, and intersect with GB line at point P1. A line connecting the two points of G and W extends, and intersect with RB at point P2. The quadrilateral composed of the four points W, P1, B and P2 is defined as a standard B-area. In the same way, the R', G', B', and W' color coordinates of the display panel according to the exemplary embodiment can be drawn in the chromaticity diagram. A line connecting the two points of R' and W' extends, and intersect with G'B' line at point P1'. A line connecting the two points of G' and W' extends, and intersect with R'B' line at point P2'. A quadrilateral composed of W', P1', B', and P2' is defined as the B-area of the display panel of this exemplary embodiment.

The B-Area matching rate in Table 1 refers to a ratio of an overlapping area of W', P1', B', P2' quadrilaterals (i.e., B-Area of the display panel) and standard W, P1, B, P2 quadrilaterals (i.e., standard B-Area) of the display panel according to the exemplary embodiment to an area of the standard B-Area.

According to the calculation results in Table 1, when the ratio of the transmittance of the first blue sub-pixel for short-wave blue light to the transmittance of the second blue sub-pixel for long-wave blue light is 0.1:1 or 0.2:1, the B-Area matching rate is the highest, which reaches 98.9%, and the proportions of the harmful blue light are 39.5% and 43% at this time, which are both less than 50%, and meet the low blue light standard of TUV.

According to the calculation results in Table 1, as the ratio of the transmittance of the first blue sub-pixel for short-wave blue light to the transmittance of the second blue sub-pixel for long-wave blue light gradually increases, the sRGB matching rate and B-Area matching rate first increase and then decrease, and the proportion of the harmful blue light always increases. In order to balance the color gamut with the low blue light standard, the ratio of the transmittance of the first blue sub-pixel for short-wave blue light to the transmittance of the second blue sub-pixel for long-wave blue light can be selected to be in the range of 0.1 to 0.2, that is, the ratio of transmittance is greater than or equal to 0.1 and less than or equal to 0.2. In this way, the low blue light standard of TUV can be met, the display color gamut of the display panel can be improved, and the expression of color can be enhanced.

Figure 11:
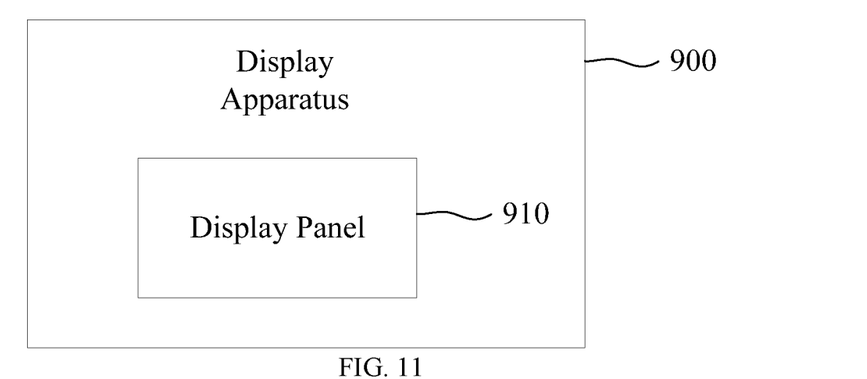
FIG. 11 is a schematic diagram of a display apparatus according to at least one embodiment of the present disclosure.

FIG. 11 is a schematic diagram of a display apparatus according to at least one embodiment of the present disclosure. As shown in FIG. 11, this embodiment provides a display apparatus 900, which includes a display panel 910. The display panel 910 is the liquid crystal display panel provided in the previous embodiments. The display apparatus 900 may be any product or component with a display function such as a liquid crystal display apparatus, a mobile phone, a tablet computer, a television, a monitor, a laptop computer, a digital photo frame, a navigator, a vehicle display, a watch, a wristband, etc. However, this is not limited in the present embodiment.

In the description of embodiments of the present disclosure, orientation or positional relations indicated by terms "middle", "upper", "lower", "front", "back", "vertical", "horizontal", "top", "bottom", "inside", "outside" and the like are based on the orientation or positional relations shown in the drawings, and are for the purpose of ease of description of the present disclosure and simplification of the description only, but are not intended to indicate or imply that the mentioned device or element must have a specific orientation, or be constructed and operated in a particular orientation, and therefore they should not be construed as limitation to the present disclosure.

Although the embodiments disclosed in the present disclosure are as described above, the described contents are only the embodiments for facilitating understanding of the present disclosure, which are not intended to limit the present disclosure. Those of ordinary skilled in the art to which the present disclosure pertains may make any modifications and variations in the form and details of implementation without departing from the essence and the scope of the present disclosure. Nevertheless, the scope of patent protection of the present disclosure shall still be determined by the scope defined by the appended claims.

What is claimed is:

1. A display panel, comprising an array substrate, a color filter substrate, and a back light module; the back light module comprises a light source, wherein:

a light emission spectrum of the light source has a first blue peak and a second blue peak, and a peak wavelength of the first blue peak is smaller than a peak wavelength of the second blue peak; the color filter substrate is provided with a plurality of pixel units which are periodically and repeatedly disposed, and at least one of the pixel units comprises a red sub-pixel, a green sub-pixel, a first blue sub-pixel and a second blue sub-pixel;

the first blue sub-pixel and the second blue sub-pixel have different transmittance spectrums; a peak wavelength of a transmittance spectrum of the first blue sub-pixel matches the peak wavelength of the first blue peak of the light source, and a peak wavelength of a transmittance spectrum of the second blue sub-pixel matches the peak wavelength of the second blue peak of the light source;

a transmittance of the first blue sub-pixel for light of a first wavelength band is smaller than a transmittance of the second blue sub-pixel for light of a second wavelength band;

the peak wavelength of the transmittance spectrum of the first blue sub-pixel matching the peak wavelength of the first blue peak of the light source comprises:

the peak wavelength of the transmittance spectrum of the first blue sub-pixel is less than the peak wavelength of the first blue peak of the light source and greater than or equal to a first set value, wherein the first set value is a difference between the peak wavelength of the first blue peak of the light source and 10 nanometers;

the peak wavelength of the transmittance spectrum of the second blue sub-pixel matching the peak wavelength of the second blue peak of the light source comprises:

the peak wavelength of the transmittance spectrum of the second blue sub-pixel is greater than the peak wavelength of the second blue peak of the light source and less than or equal to a second set value, wherein the second set value is a sum of the peak wavelength of the second blue peak of the light source and 10 nanometers;

a ratio of the transmittance of the first blue sub-pixel for the light of the first wavelength band to the transmittance of the second blue sub-pixel for the light of the second wavelength band is less than or equal to 0.4; and the peak wavelength of the transmittance spectrum of the first blue sub-pixel is about 438 nm, and the peak wavelength of the transmittance spectrum of the second blue sub-pixel is about 467 nm.

2. The display panel according to claim 1, wherein the ratio of the transmittance of the first blue sub-pixel for the light of the first wavelength band to the transmittance of the second blue sub-pixel for the light of the second wavelength band ranges from 0.1 to 0.2.

3. The display panel according to claim 1, wherein a difference between the peak wavelength of the second blue peak of the light source and the peak wavelength of the first blue peak of the light source is greater than or equal to 10 nanometers.

4. The display panel according to claim 3, wherein the peak wavelength of the first blue peak of the light source is about 445 nm, and the peak wavelength of the second blue peak of the light source is about 460 nm.

5. The display panel according to claim 4, wherein a half-peak width of the transmittance spectrum of the first blue sub-pixel is about 52 nm; and a half-peak width of the transmittance spectrum of the second blue sub-pixel is about 49 nm.

6. The display panel according to claim 1, wherein the red sub-pixel, the green sub-pixel, the first blue sub-pixel and the second blue sub-pixel in the pixel unit have a same size.

7. The display panel according to claim 1, wherein the red sub-pixel, the green sub-pixel, the first blue sub-pixel and the second blue sub-pixel are disposed in parallel along a first direction, and adjacent sub-pixels are disposed at intervals;
wherein the first direction is a length direction or a width direction of the color filter substrate.

8. The display panel according to claim 1, wherein the light source comprises a first light-emitting chip and a second light-emitting chip connected in series; a light-emitting wavelength band of the first light-emitting chip is different from a light-emitting wavelength band of the second light-emitting chip.

9. The display panel according to claim 1, wherein the light source is a side-incidence type of back light source or a straight down type of back light source.

10. The display panel according to claim 1, wherein the array substrate and the color filter substrate are sequentially stacked, and the back light module is located on one side of the array substrate away from the color filter substrate.

11. The display panel according to claim 10, wherein a liquid crystal layer is provided between the color filter substrate and the array substrate.

12. The display panel according to claim 1, wherein the color filter substrate comprises a color filter base substrate and a color filter layer disposed on the color filter base substrate, and the color filter layer faces the array substrate.

13. The display panel according to claim 1, wherein the array substrate comprises a plurality of gate lines and a plurality of data lines, wherein the plurality of gate lines and the plurality of data lines cross with each other to define a plurality of sub-pixel regions; a pixel electrode, a common electrode and a drive circuit connected to the pixel electrode are disposed in each sub-pixel region, and the drive circuit comprises at least one thin film transistor.

14. A display apparatus comprising a display panel, and the display panel comprises an array substrate, a color filter substrate, and a back light module; the back light module comprises a light source, wherein:
a light emission spectrum of the light source has a first blue peak and a second blue peak, and a peak wavelength of the first blue peak is smaller than a peak wavelength of the second blue peak; the color filter substrate is provided with a plurality of pixel units which are periodically and repeatedly disposed, and at least one of the pixel units comprises a red sub-pixel, a green sub-pixel, a first blue sub-pixel and a second blue sub-pixel;
the first blue sub-pixel and the second blue sub-pixel have different transmittance spectrums; a peak wavelength of a transmittance spectrum of the first blue sub-pixel matches the peak wavelength of the first blue peak of the light source, and a peak wavelength of a transmittance spectrum of the second blue sub-pixel matches the peak wavelength of the second blue peak of the light source;
a transmittance of the first blue sub-pixel for light of a first wavelength band is smaller than a transmittance of the second blue sub-pixel for light of a second wavelength band;
the peak wavelength of the transmittance spectrum of the first blue sub-pixel matching the peak wavelength of the first blue peak of the light source comprises:
the peak wavelength of the transmittance spectrum of the first blue sub-pixel is less than or equal to the peak wavelength of the first blue peak of the light source and greater than or equal to a first set value, wherein the first set value is a difference between the peak wavelength of the first blue peak of the light source and 10 nanometers;
the peak wavelength of the transmittance spectrum of the second blue sub-pixel matching the peak wavelength of the second blue peak of the light source comprises:
the peak wavelength of the transmittance spectrum of the second blue sub-pixel is greater than or equal to the peak wavelength of the second blue peak of the light source and less than or equal to a second set value, wherein the second set value is a sum of the peak wavelength of the second blue peak of the light source and 10 nanometers;
a ratio of the transmittance of the first blue sub-pixel for the light of the first wavelength band to the transmittance of the second blue sub-pixel for the light of the second wavelength band is less than or equal to 0.4; and
the peak wavelength of the transmittance spectrum of the first blue sub-pixel is about 438 nm, and the peak wavelength of the transmittance spectrum of the second blue sub-pixel is about 467 nm.

* * * * *